United States Patent
Calkins et al.

(10) Patent No.: US 12,065,234 B2
(45) Date of Patent: Aug. 20, 2024

(54) PROPELLER CONTROL SYSTEM FOR AN AIRCRAFT

(71) Applicant: General Electric Company, Schenectady, NY (US)

(72) Inventors: Steven Clark Calkins, Byfield, MA (US); Christopher Roy Carrington, Gloucester (GB); Thomas Bradley Kenney, Ashby, MA (US); Simone Castellani, Viareggio (IT); Albion Richardson Fletcher, Jr., Braintree, MA (US)

(73) Assignees: GE Aviation Systems Limited, Cheltenham (GB); GE Avio S.r.l., Rivalta di Torino (IT); General Electric Company, Cincinnati, OH (US)

( * ) Notice: Subject to any disclaimer, the term of this patent is extended or adjusted under 35 U.S.C. 154(b) by 1094 days.

(21) Appl. No.: 16/020,121

(22) Filed: Jun. 27, 2018

(65) Prior Publication Data

US 2019/0031319 A1 Jan. 31, 2019

(30) Foreign Application Priority Data

Jul. 28, 2017 (EP) .................................... 17425082

(51) Int. Cl.
*B64C 11/40* (2006.01)
*B64C 11/30* (2006.01)
(Continued)

(52) U.S. Cl.
CPC ............ *B64C 11/40* (2013.01); *B64C 11/303* (2013.01); *B64C 11/385* (2013.01); *B64C 11/44* (2013.01)

(58) Field of Classification Search
CPC ..... B64C 11/30; B64C 11/303; B64C 11/385; B64C 11/40; B64C 11/44
See application file for complete search history.

(56) References Cited

U.S. PATENT DOCUMENTS

| 2,778,436 A | 1/1957 | Banning, Jr. |
| 3,027,949 A | 4/1962 | Biermann |

(Continued)

FOREIGN PATENT DOCUMENTS

| EP | 0311277 A2 | 4/1989 |
| GB | 1127856 | 9/1968 |

(Continued)

OTHER PUBLICATIONS

European Search Report Corresponding to EP Application 174250829 Dated Jan. 15, 2018.

(Continued)

*Primary Examiner* — Christopher R Legendre
(74) *Attorney, Agent, or Firm* — Hanley, Flight & Zimmerman, LLC (57) ABSTRACT

Propeller control systems and methods for controlling the pitch of a plurality of propeller blades of a variable pitch propeller assembly operatively coupled with an engine is provided. In one exemplary aspect, the propeller control system includes features for combining overspeed and feathering protective functions in a protective control valve communicatively coupled with a controller. In such an event the controller controls the protective control valve to selectively allow a controlled amount of hydraulic fluid to flow to or from a pitch actuation assembly such that the pitch of the propeller blades can be adjusted based at least in part on the condition of the engine.

16 Claims, 5 Drawing Sheets

(51) Int. Cl.
B64C 11/38 (2006.01)
B64C 11/44 (2006.01)

(56) References Cited

U.S. PATENT DOCUMENTS

| | | | |
|---|---|---|---|
| 3,207,227 A | 9/1965 | Timewell | |
| 3,225,592 A * | 12/1965 | Greene, Jr. | G01L 3/10 |
| | | | 73/862.29 |
| 3,518,023 A | 6/1970 | Britten et al. | |
| 4,986,734 A | 1/1991 | Layer et al. | |
| 5,019,006 A * | 5/1991 | Schneider | B64C 11/40 |
| | | | 416/35 |
| 5,174,718 A | 12/1992 | Lampeter et al. | |
| 5,213,471 A | 5/1993 | Miller et al. | |
| 5,299,911 A | 4/1994 | Moriya | |
| 5,364,231 A | 11/1994 | Eick et al. | |
| 5,897,293 A * | 4/1999 | Arel | B64C 11/303 |
| | | | 416/114 |
| 6,059,528 A | 5/2000 | Danielson et al. | |
| 8,277,182 B2 | 10/2012 | Perkinson | |
| 8,352,149 B2 * | 1/2013 | Meacham | F01D 21/003 |
| | | | 701/100 |
| 2019/0031319 A1 * | 1/2019 | Calkins | B64C 11/385 |

FOREIGN PATENT DOCUMENTS

| | | |
|---|---|---|
| JP | S54-1999 | 1/1979 |
| JP | H05-24585 A | 2/1993 |

OTHER PUBLICATIONS

Canadian Intellectual Property Office, "Notice of Allowance," issued Mar. 12, 2020 in connection with Canadian Patent Application No. 3,011,876, 1 page.

Japanese Patent Office, "Office Action," dated Oct. 23, 2019 in connection with Japanese Patent Application No. 2018-138946, 5 pages.

European Patent Office, "Communication under Rule 71(3) EPC," mailed Nov. 13, 2020 in connection with European Patent Application No. 17425082.9, 7 pages.

* cited by examiner

PROPELLER CONTROL SYSTEM FOR AN AIRCRAFT

FIELD

The present subject matter is generally related to variable pitch propeller assemblies and more particularly to control systems for variable pitch propeller assemblies.

BACKGROUND

Variable pitch propeller assemblies for aircraft are operatively configured to adjust propeller blades of the propeller assembly through a plurality of blade angles. In this manner, the propeller blades can be adjusted to a propeller blade angle that optimizes engine performance for given flight conditions. To adjust the propeller blade angle of the propeller blades, variable pitch propeller assemblies typically include a pitch control unit. Certain pitch control units can include a primary pitch control valve or governor controlled by an electrohydraulic servovalve (EHSV). Based on one or more input signals, the primary control valve selectively allows an amount of hydraulic fluid to flow to or drain from a pitch actuation assembly positioned within the propeller assembly. By altering the amount of hydraulic fluid in the pitch actuation assembly, the blade angle of the propeller blades can be set to the desired pitch.

For constant-speed variable pitch propeller assemblies, the pitch control unit is configured to maintain constant engine speed by adjusting the propeller blade angle to vary the load on the propeller in response to changing flight conditions. In particular, the primary control valve modulates the pitch of the propeller blades to keep the reference speed. In some instances, the propeller assembly can experience an overspeed condition, which occurs when propeller RPM increases above the reference speed, and in some instances, the propeller assembly can experience an underspeed condition, which occurs when propeller RPM decreases below the reference speed. When an overspeed or underspeed condition is experienced, the primary control valve controls the flow of hydraulic fluid through the system such that the propeller assembly returns to an onspeed condition, or a condition in which the actual RPM of the engine is the same as the reference speed.

In some cases, however, the primary control valve can fail or can be unresponsive when the propeller assembly experiences an overspeed condition. To prevent the propeller assembly from reaching a destructive overspeed condition, pitch control units typically include an overspeed governor. Overspeed governors intervene when propeller speed reaches an overspeed reference value typically higher than the reference speed and adjusts pitch in a manner that overrides the primary control valve in a coarsening direction and governs to the overspeed reference value. In the past, overspeed governors have typically been mechanical devices (e.g., fly weight governors). However, such conventional mechanical overspeed governors include many parts, increase the weight of the engine, and typically include overspeed testing components (e.g., solenoid test valves) for ensuring proper operation of the overspeed governor. The weight of the overspeed governor and overspeed testing components are penalties on the efficiency of the engine. This penalty is costly as the overspeed governor and testing components are used relatively infrequently.

Moreover, some variable pitch propeller assemblies are configured as feathering propeller assemblies. Such feathering propeller assemblies typically include a solenoid-operated feather valve. The solenoid-operated feather valve is operatively configured to switch the propeller assembly into a full feather mode. The feathering mode can be commanded by a pilot by a dedicated cockpit switch, can be commanded by an engine controller after a normal shutdown, or can be commanded automatically by the engine controller (i.e., autofeather) when an engine flames out or an unexpected sudden reduction of power is detected. Such conventional solenoid-operated feather valves and accompanying sensing components can increase the weight of the engine, which is a penalty on the efficiency of the engine. This penalty is costly as the feather valve is used relatively infrequently.

Therefore, there is a need for improved propeller control systems and/or methods therefore that address one or more of these challenges.

BRIEF DESCRIPTION

Aspects and advantages of the invention will be set forth in part in the following description, or may be obvious from the description, or may be learned through practice of the invention.

In one exemplary aspect, the present subject matter is directed to an engine defining an axial direction, a radial direction, and a circumferential direction. The engine includes a variable pitch propeller assembly driven by the engine. The propeller includes a plurality of propeller blades rotatable about the axial direction and spaced apart along the circumferential direction, each propeller blade rotatable through a plurality of blade angles about their respective pitch axes each extending in the radial direction. The engine further including a propeller control system that includes a pitch actuation assembly for adjusting the plurality of propeller blades through the plurality of blade angles. The propeller control system also includes a pitch control unit. The pitch control unit includes a primary control valve configured to selectively allow a flow of hydraulic fluid to or from the pitch actuation assembly. The pitch control unit also includes a protective control valve configured to selectively allow a flow of hydraulic fluid to or from the pitch actuation assembly. The pitch control unit further includes a controller communicatively coupled with the primary control valve and the protective control valve, wherein the controller is configured to: determine a condition of the engine; and to control the protective control valve to selectively allow a controlled amount of hydraulic fluid to or from the pitch actuation assembly based at least in part on the condition of the engine.

In some embodiments, the condition is an overspeed condition.

In some embodiments, the condition is an engine failure condition, and wherein the controlled amount of hydraulic fluid is an amount sufficient to position the propeller blades in a full feather position.

In yet some embodiments, the controller is configured to control the protective control valve to selectively allow the controlled amount of hydraulic fluid to or from the pitch actuation assembly if the condition is either an overspeed condition or an engine failure condition.

In some embodiments, the protective control valve is controlled by an electrohydraulic servovalve.

In some embodiments, the primary control valve is controlled by an electrohydraulic servovalve.

In some embodiments, the protective control valve is controlled by an electrohydraulic servovalve and the primary control valve is controlled by an electrohydraulic servovalve.

In yet other embodiments, the controller is equipped with full authority digital engine and propeller control.

In some embodiments, the propeller control system further includes a rotary component rotatable about the axial direction in unison with the propeller blades. The propeller control system further includes a primary speed sensor for sensing the rotational speed of the rotary component, the primary speed sensor communicatively coupled with the controller. The propeller control system also includes a protective speed sensor for sensing the rotational speed of the rotary component, the protective speed sensor communicatively coupled with the controller.

In another exemplary aspect, the present subject matter is directed to a propeller control system for a variable pitch propeller assembly driven by an engine defining an axial direction, a radial direction, and a circumferential direction. The variable pitch propeller assembly includes a plurality of propeller blades rotatable about the axial direction and spaced apart along the circumferential direction, each propeller blade rotatable through a plurality of blade angles about their respective pitch axes each extending in the radial direction. The propeller control system includes a pitch actuation assembly for adjusting the plurality of propeller blades through the plurality of blade angles. The propeller control system further includes a pitch control unit. The pitch control unit includes a primary control valve configured to selectively allow a flow of hydraulic fluid to or from the pitch actuation assembly. The pitch control unit further includes a protective control valve configured to selectively allow a flow of hydraulic fluid to or from the pitch actuation assembly. The propeller control system also includes a controller communicatively coupled with the primary control valve and the protective control valve, wherein the controller is configured to: determine a condition of the engine, wherein the condition is one of an overspeed condition or an engine failure condition; and to control the protective control valve to selectively allow a controlled amount of hydraulic fluid to the pitch actuation assembly based at least in part on the condition determined.

In some embodiments, when the condition is the engine failure condition, the controlled amount of hydraulic fluid is an amount sufficient to position the propeller blades in a full feather position.

In some embodiments, the controller includes a protective logic module for controlling the protective control valve, and wherein the protective logic module includes an overspeed logic module and a feathering logic module.

In some embodiments, the propeller control system further includes a rotary component rotatable about the axial direction in unison with the propeller blades. The propeller control system also includes a protective speed sensor for sensing the rotational speed of the rotary component, the protective speed sensor communicatively coupled with the controller. In addition, the propeller control system can also include a protective blade angle feedback sensor for sensing the axial position of the rotary component such that the blade angle of the propeller blades can be determined, the protective blade angle feedback sensor communicatively coupled with the controller.

In some embodiments, the protective control valve is controlled by an electrohydraulic servovalve.

In some embodiments, the primary control valve is controlled by an electrohydraulic servovalve.

In some embodiments, the protective control valve is controlled by an electrohydraulic servovalve and the primary control valve is controlled by an electrohydraulic servovalve.

In another exemplary aspect, the present subject matter is directed to a method for controlling a variable pitch propeller assembly driven by a powerplant using a propeller control system, the powerplant defining an axial direction and a radial direction and including a controller. The variable pitch propeller assembly includes a plurality of propeller blades rotatable about the axial direction and adjustable about their respective pitch axes each extending along the radial direction. The propeller control system includes a pitch actuation assembly for actuating the propeller blades about their respective pitch axes and a pitch control unit that includes a primary control valve and a protective control valve both communicatively coupled with the controller. The primary control valve and the protective control valve are each configured to selectively control a flow of hydraulic fluid to or from the pitch actuation assembly. The method includes operating the powerplant; determining a condition of the powerplant; and controlling the protective control valve to selectively allow a controlled amount of hydraulic fluid to flow to or from the pitch actuation assembly based at least in part on the condition determined.

In some implementations, during determining the condition, the method further includes obtaining one or more signals indicative of a power setting of the powerplant; obtaining one or more signals indicative of the rotational speed of the propeller blades about the axial direction; and comparing the power setting with the rotational speed of the propeller blades.

In some implementations, the condition is an powerplant failure condition, and wherein during determining the condition of the powerplant, the method further includes obtaining one or more signals indicative of a power setting of the powerplant; obtaining one or more signals indicative of a torque output of the powerplant; and comparing the power setting with the torque output of the powerplant. In such implementations, when the protective control valve selectively allows the a controlled amount of hydraulic fluid to flow to or from the pitch actuation assembly, the controlled amount is an amount sufficient to position the propeller blades in a fully feathered position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is directed to propeller control systems and methods therefore for controlling the pitch of a plurality of propeller blades of a propeller assembly. In one exemplary aspect, the propeller control system includes features for combining overspeed and feathering protective functions. In particular, in one exemplary aspect, the propeller control system includes a protective control valve operatively configured to protect the propeller assembly and engine from an overspeed condition as well as providing feathering functionality in the event the primary pitch control valve fails or is unresponsive or operating conditions otherwise require it. The protective control valve is communicatively coupled with a controller that includes overspeed and feathering logic modules. Based on one or more propeller speed feedback signals or one or more blade angle feedback signals (or both), the controller, utilizing one of the overspeed and feathering logic modules, sends one or more signals to the protective control valve such that the protective control valve selectively allows an amount of hydraulic fluid to flow to or from a pitch actuation assembly of the propeller assembly. In this way, if the primary control valve fails or is unresponsive, the protective control valve can protect the propeller assembly and engine from a destructive overspeed condition or from remaining in an unfeathered position in the event of engine failure.

By combining the overspeed and feathering functions into an electronically controlled protective control valve, conventional fly-ball overspeed governors and their accompanying overspeed testing components, as well as conventional separate solenoid-operated feather valves, can be eliminated. Notably, by combining overspeed and feathering functions into a protective control valve, the weight of the engine or power plant can be reduced. Moreover, as the controller controls the protective overspeed and feathering functions, the electronically controlled protective control valve offers more system flexibility. Stated differently, thresholds and settings relating to when an engine is operating in an onspeed or overspeed can be adjusted, or these thresholds and settings can be adjusted when an engine failure condition has actually occurred. Conventional mechanical overspeed governors and binary feathering valves offered no such flexibility.

In another exemplary aspect, the propeller control system further includes features for combining overspeed and feathering protective functions. By combining the overspeed and feathering functions into an electronically controlled protective control valve, the weight of the engine can be reduced and additional system flexibility can be achieved.

Figure 1:
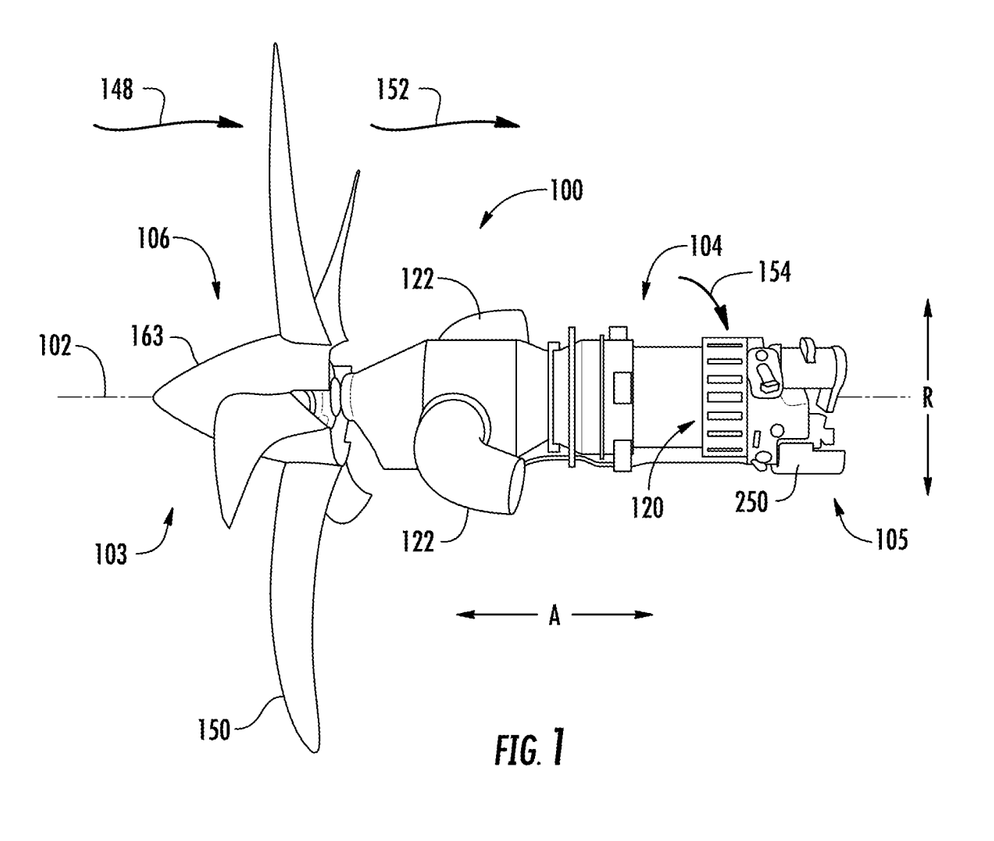
FIG. 1 provides a side view of an exemplary gas turbine engine according to an exemplary embodiment of the present disclosure.
Figure 2:
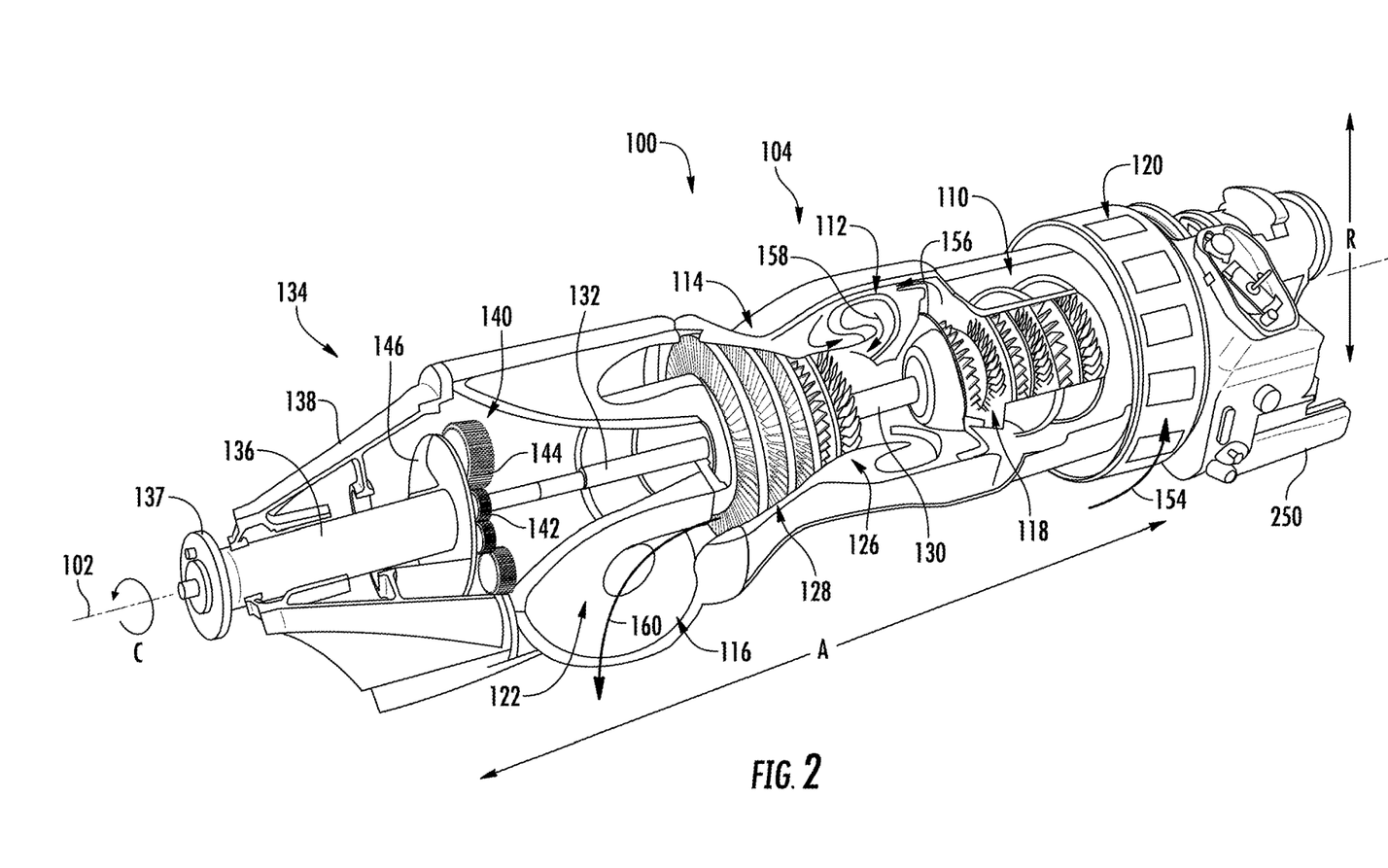
FIG. 2 provides a perspective, cutaway view of the gas turbine engine of FIG. 1.

Turning now to the drawings with reference to FIGS. 1 and 2, FIG. 1 provides a side view of an exemplary engine and FIG. 2 provides a perspective, cutaway view of the engine of FIG. 1 according to exemplary embodiments of the present disclosure. As shown in FIG. 1, for this embodiment, the engine is a gas turbine engine 100 configured as a turboprop engine. The gas turbine engine 100 defines an axial direction A, a radial direction R, and a circumferential direction C (FIG. 2) disposed about the axial direction A. The gas turbine engine 100 extends generally along the axial direction A between a first end 103 and a second end 105, which for this embodiment is the forward and aft end, respectively. The gas turbine engine 100 generally includes a gas generator or core turbine engine 104 and a propeller assembly 106 rotatable about the axial direction A. The gas turbine engine 100 defines an axial centerline 102 extending through the core turbine engine 104 and the propeller assembly 106 along the axial direction A.

As shown in FIG. 2, the core turbine engine 104 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this embodiment, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 may define one or more turbines, such as a high pressure turbine (HPT) and a low pressure turbine (LPT). For this embodiment, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 1). The exhaust section 116 includes one or more exhaust outlets 122 for routing the combustion products to the ambient air.

Referring still to FIG. 2, the core turbine engine 104 can include one or more shafts. For this embodiment, the gas turbine engine 100 includes a compressor shaft 130 and a free or power shaft 132. The compressor shaft 130 drivingly couples the turbine section 114 with the compressor section 110 to drive the rotational components of the compressor.

The power shaft 132 drivingly couples the power turbine 128 to drive a gear train 140 of the propeller gearbox 134, which in turn operatively supplies power and torque to the propeller assembly 106 via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this embodiment, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some embodiments, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142 which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller assembly 106.

In addition, the gas turbine engine 100 includes one or more controllers 250 that control the core turbine engine 104 and the propeller assembly 106. For this embodiment, the controller 250 is a single unit equipped with Full Authority Digital Engine and Propeller Control (FADEPC) for providing full digital control of the core turbine engine 104 and the propeller assembly 106. In some alternative embodiments, the gas turbine engine 100 can include more than one controller for controlling the core turbine engine 104 and the propeller assembly 106. For example, in some exemplary embodiments, the gas turbine engine 100 can include an engine controller equipped with Full Authority Digital Engine Control (FADEC) and a propeller controller equipped with Full Authority Digital Propeller Control (FADPC). In such embodiments, the engine controller and the propeller controller are communicatively coupled.

For the controller depicted in the illustrated embodiment of FIGS. 1 and 2, the controller 250 can control various aspects of the core turbine engine 104 and the propeller assembly 106. For example, the controller 250 can receive one or more signals from sensory or data collection devices and can determine the blade angle of a plurality of propeller blades 150 about their respective pitch axes, as well as their rotational speed about the axial direction A based at least in part on the received signals. The controller 250 can in turn control one or more components of the gas turbine engine 100 based on such signals. For example, based at least in part on one or more speed or blade pitch signals (or both), the controller 250 can be operatively configured to control one or more valves such that an amount of hydraulic fluid can be delivered or returned from a pitch actuation assembly of the gas turbine engine 100 as will be described in greater detail herein. The internal components of the controller 250 will likewise be described in greater detail herein.

With reference to FIG. 1, during operation of the gas turbine engine 100, a volume of air indicated by arrow 148 passes across the plurality of propeller blades 150 circumferentially spaced apart from one another along the circumferential direction C and disposed about the axial direction A, and more particularly for this embodiment, the axial centerline 102. The propeller assembly 106 includes a spinner 163 aerodynamically contoured to facilitate an airflow through the plurality of propeller blades 150. The spinner 163 is rotatable with the propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air indicated by arrow 154 is directed or routed through the annular inlet 120 of the gas turbine engine 100.

As shown in FIG. 2, the second portion of air 154 enters through the annular inlet 120 and flows downstream to the compressor section 110, which is a forward direction along the axial direction A in this embodiment. The second portion of air 154 is progressively compressed as it flows through the compressor section 110 downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the compressor shaft 130 to rotate, and as a result, the rotary components of the compressor are rotated about the axial direction A. In a similar fashion, the power turbine 128 extracts energy from the combustion gases 158, causing the blades of the power turbine 128 to rotate about the axial direction A. The rotation of the turbine blades of the power turbine 128 causes the power shaft 132 to rotate, which in turn drives the power gear train 140 of the propeller gearbox 134. The propeller gearbox 134 in turn transmits the power provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly for this embodiment, the axial centerline 102 of the gas turbine engine 100. The exhaust gases, denoted by 160, exit the core turbine engine 104 through the exhaust outlets 122 to the ambient air.

It should be appreciated that the exemplary gas turbine engine 100 described herein is provided by way of example only. For example, in other exemplary embodiments, the engine may include any suitable number or types of compressors (such as e.g., reverse flow and/or axial compressors), turbines, shafts, stages, etc. Additionally, in some exemplary embodiments, the gas turbine engine may include any suitable type of combustor, and may not include the exemplary reverse-flow combustor depicted. It will further be appreciated that the engine can be configured as any suitable type of gas turbine engine, including, for example, turboshaft, turbojets, etc. Moreover, in yet other embodiments, the engine can be configured as a reciprocating or piston engine. In addition, it will be appreciated that the present subject matter can be applied to or employed with any suitable type of propeller or fan configuration, including, for example, tractor and pusher configurations.

Furthermore, although the gas turbine engine 100 described above is an aeronautical gas turbine engine for propulsion of a fixed-wing aircraft, the gas turbine engine may be configured as any suitable type of gas turbine engine for use in any number of applications, such as marine applications. Furthermore the invention could be used on other devices with variable pitch blades such as windmills. The propeller assembly 106 may rotate due to passing of a fluid, such as air or water, across the plurality of blades 150 of the propeller assembly 106.

Figure 3:
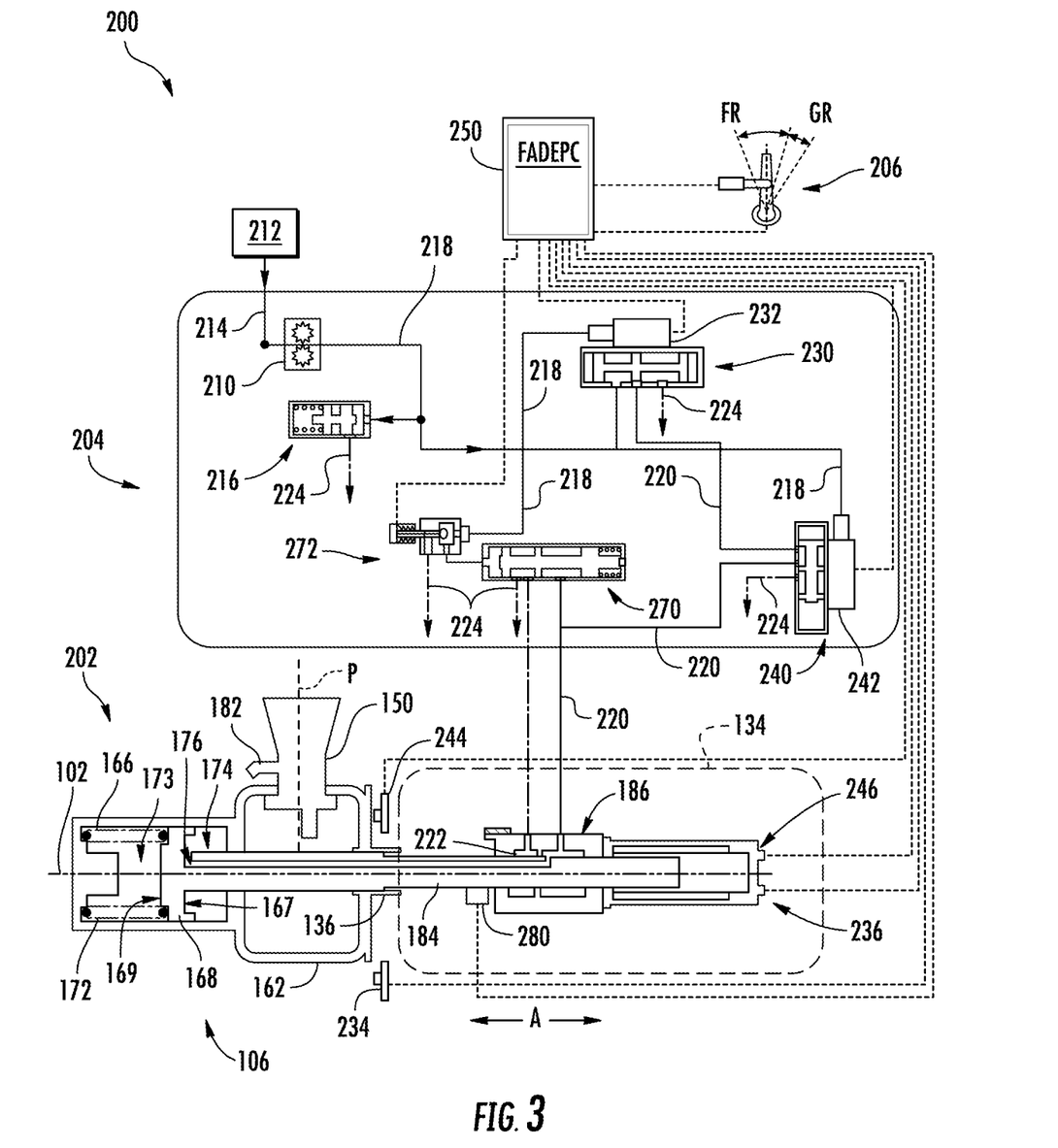
FIG. 3 provides a schematic view of an exemplary propeller control system of the gas turbine engine of FIG. 1.

FIG. 3 provides a schematic view of an exemplary propeller control system 200 for controlling the propeller assembly 106 of the gas turbine engine 100 of FIG. 1 according to an exemplary embodiment of the present disclosure. As depicted in FIG. 3, the propeller assembly 106 is driven by the core turbine engine 104 by the propeller shaft 136. The propeller shaft 136 in turn drives a hub 162 from which the plurality of propeller blades 150 extend outwardly from in the radial direction R. As the propeller shaft 136 rotates about the axial direction A, the hub 162 in turn rotates the propeller blades 150 about the axial direction A. The propeller control system 200 includes features for controlling the rotational speed of the propeller blades 150 about the axial direction A and the pitch of the propeller blades 150, as well as features for protecting the components of the propeller assembly 106. As shown in FIG. 3, for this embodiment, generally, the propeller control system 200 includes a pitch actuation assembly 202, a pitch control unit 204, a power lever 206, and controller 250. Each will be discussed in turn.

Generally, the pitch actuation assembly 202 is operatively configured to adjust the plurality of propeller blades 150 through a plurality of blade angles. Stated differently, the pitch actuation assembly 202 is operatively configured to rotate each propeller blade 150 about a pitch axis P extending in the radial direction R (each pitch axis P is relative to a corresponding propeller blade 150). For the exemplary embodiment of FIG. 3, the pitch actuation assembly 202 is operatively configured to rotate the plurality of propeller blades 150 from low or fine pitch to high or coarse pitch, such as e.g., a fully feathered blade angle. Moreover, for this exemplary embodiment, the pitch actuation assembly 202 is additionally operatively configured to rotate the plurality of propeller blades 150 through reverse pitch angles, which can be useful for ground or taxiing operations, particularly where an aircraft includes multiple engines. In this regard, the exemplary propeller assembly 106 depicted in FIG. 3 is a variable pitch, full feathering propeller assembly, and more particularly still, the propeller assembly is configured as a variable pitch constant-speed, full feathering propeller assembly.

As shown in FIG. 3, for this embodiment, the pitch actuation assembly 202 includes a single-acting system for controlling the pitch of the propeller blades 150. It will be appreciated, however, that the pitch actuation assembly 202 can be a double-acting system in other exemplary embodiments. The single-acting system pitch actuation assembly 202 of FIG. 3 includes a housing or cylinder 166 that defines one or more chambers and encloses a control piston 168 that is translatable along the axial direction A within the cylinder 166. In particular, as shown, the cylinder 166 and the outboard side 169 of the control piston 168 define a first chamber 173 and the cylinder 166 and the inboard side 167 of the control piston 168 define a second chamber 174. The control piston 168 separates the first chamber 173 from the second chamber 174 along the axial direction A. The control piston 168 is biased on its outboard side 169 by a feather spring 172 positioned within the first chamber 173, as well as by counterweights 182 operatively coupled with one or more propeller blades 150.

Figure 4:
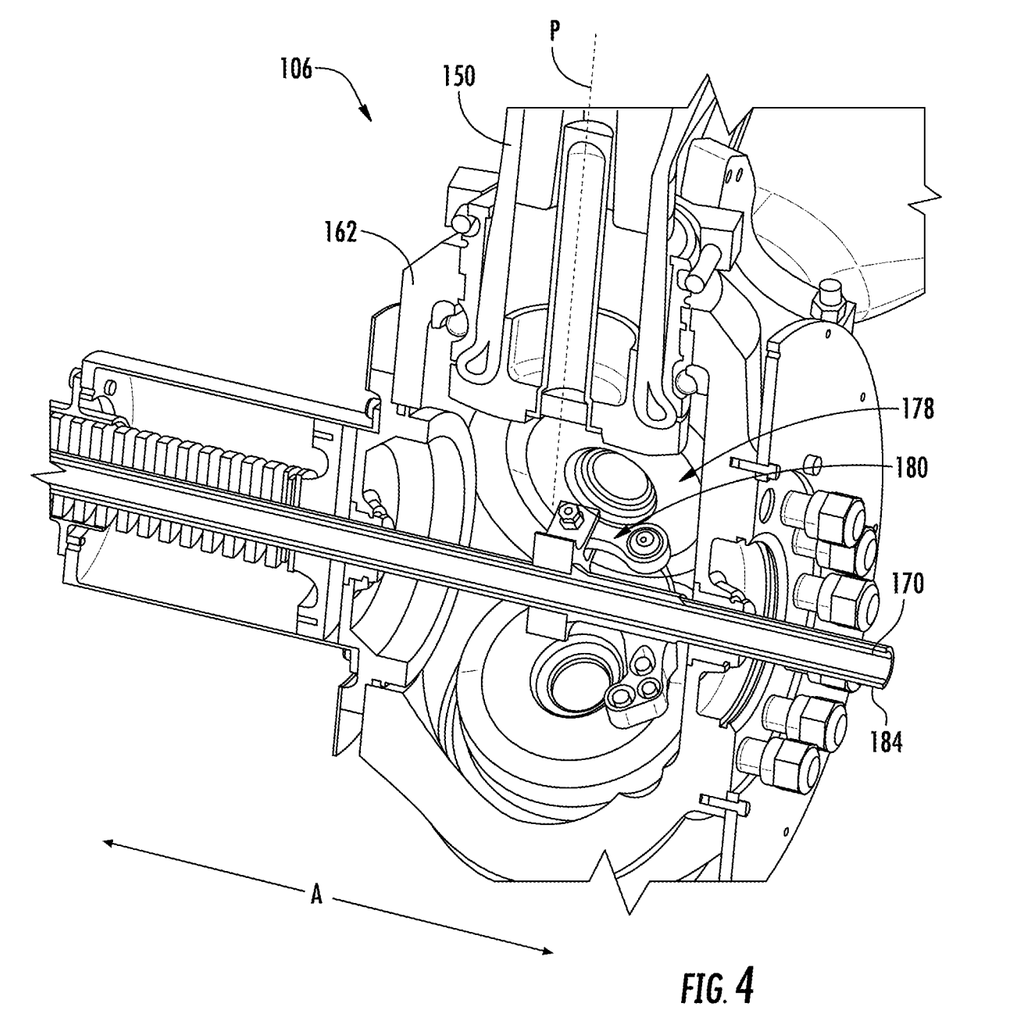
FIG. 4 provides a close up, cutaway perspective view of an exemplary beta tube and propeller pitch actuator of the propeller assembly of FIG. 1.

As further shown in FIG. 3, the control piston 168 is operatively coupled with a piston rod 184 that extends along the axial direction A. In particular, the piston rod 184 extends from the propeller assembly 106 (where the piston rod 184 is connected to the control piston 168) to the propeller gearbox 134 along the axial direction A. The piston rod 184 encloses an oil transfer or beta tube 170 that also extends along the axial direction A (FIG. 4). When the propeller blades 150 are rotated about the axial direction A, the piston rod 184 and the beta tube 170 are likewise rotatable about the axial direction A. Like the piston rod 184, the beta tube 170 extends at least partially into the propeller assembly 106 and at least partially into the propeller gearbox 134 positioned within the gearbox housing 138. To control the blade angles of the propeller blades 150, hydraulic fluid (e.g., oil) can be fed through the beta tube 170 and/or other fluid channels to the second chamber 174 (or to the first chamber 173 in a double-acting system) to translate the control piston 168 along the axial direction A. In some embodiments, the beta tube 170 can define one or more orifices 176 that permit hydraulic fluid to flow from the hollow beta tube 170 to the second chamber 174 depending on the desired blade pitch.

With reference still to FIG. 3, during operation of the gas turbine engine 100, for this exemplary embodiment, the spring 172 and the counterweights 182 constantly urge the control piston 168 along the axial direction A (a direction to the right in FIG. 3) such that the propeller blades 150 operatively coupled with the control piston 168 (e.g., by the piston rod and an actuation lever coupled thereto) are driven toward a coarse or high pitch position.

To actuate the propeller blades 150 toward a low or fine pitch position, an amount of hydraulic fluid is delivered to the second chamber 174 such that a force sufficient to overcome the biasing force of the spring 172 and the counterweights 182 is applied to the inboard side 167 of the control piston 168. The hydraulic force on the inboard side 167 of the control piston 168 actuates the control piston 168 along the axial direction A (a direction to the left in FIG. 3). This in turn causes the piston rod 184 and enclosed beta tube 170 to translate forward along the axial direction A (or toward the left in FIG. 3). When the control piston 168 is moved forward along the axial direction A, the propeller blades 150 are rotated to a more fine pitch position.

When it is desired to adjust the angle of the propeller blades 150 back toward high pitch, an amount of hydraulic fluid within the second chamber 174 is returned or scavenged back to the engine such that the spring 172 and the counterweights 182 can urge the control piston 168 rearward along the axial direction A (a direction to the right in FIG. 3). The hydraulic fluid can drain through the beta tube 170 and to an oil transfer bearing 186 positioned within the propeller gearbox 134. The hydraulic fluid can then be drained to a sump or other like structure.

The translation of the control piston 168 along the axial direction A in turn causes the piston rod 184 to translate along the axial direction A as well. To move the propeller blades 150 about their respective pitch axes P, the propeller assembly 106 includes a pitch actuation or propeller pitch actuator 178 (FIG. 4) to pitch or actuate the propeller blades 150. When the control piston 168 is translated along the axial direction A, the propeller pitch actuator 178, which is operatively coupled to the piston rod 184 in this embodiment, rotates the propeller blades 150 about their respective pitch axes P. Accordingly, the axial position of the piston rod 184 and beta tube 170 corresponds with a particular blade angle or angular position of the propeller blades 150.

FIG. 4 provides a close up, cutaway perspective view of the piston rod 184 and enclosed beta tube 170 and exemplary propeller pitch actuator 178 operatively coupled thereto according to exemplary embodiments of the present disclosure. As shown, the piston rod 184 is operatively coupled with the propeller pitch actuator 178, which in this embodiment includes an actuation lever 180. The actuation lever 180 is operatively coupled to the plurality of blades 150 such that movement of the actuation lever 180 along the axial direction A moves or rotates the plurality of blades 150 about their respective pitch axes P. Stated alternatively, as the piston rod 184 and enclosed beta tube 170 translate along the axial direction A (caused by the axial displacement of the control piston 168), the actuation lever 180 also translates along the axial direction A. This in turn causes the plurality of blades 150 to rotate about their respective pitch axes P, thereby adjusting the blade angles of the propeller blades 150 to the desired pitch. Thus, by controlling the quantity of hydraulic fluid within the second chamber 174, the propeller blades 150 can be controlled through a plurality of blade angles about their respective pitch axes P by the actuation lever 180.

In some exemplary embodiments, it will be appreciated that the propeller pitch actuator 178 may include additional or alternative structures that provide feathering or pitch actuation functionality. For example, such structures may include actuation linkages linking the control piston 168, piston rod, or other axially displaceable components with the propeller blades 150. Other structures may include a yoke and cam assembly operatively coupled with the beta tube 170 and/or piston rod 184 enclosing the beta tube 170. Any suitable structure can be used to feather the propeller blades 150 about their respective pitch axes P. Stated alternatively, any known assemblies or structures for converting the translatory motion of the piston rod 184 into rotational motion of the propeller blades 150 is contemplated.

Returning to FIG. 3, an exemplary pitch control unit 204 of the propeller control system 200 will now herein be described. Generally, the pitch control unit 204 is operatively configured to provide an amount of hydraulic fluid to the pitch actuation assembly 202 such that the pitch actuation assembly 202 can adjust the plurality of propeller blades 150 through a plurality of blade angles. More specifically, the pitch control unit 204 is operatively configured to deliver or return an amount of hydraulic fluid from the second chamber 174 such that the control piston 168 is translated along the axial direction A, which in turn drives the piston rod 184 along the axial direction A, causing the propeller pitch actuator 178 to adjust the plurality of propeller blades 150 about their respective pitch axes P.

For this embodiment, the pitch control unit 204 includes a high pressure pump 210 positioned downstream of and in fluid communication with a lubrication supply 212, such as e.g., hydraulic fluid from the engine. The lubrication supply 212 is configured to supply hydraulic fluid, such as, e.g., oil, to the propeller control system 200. The high pressure pump 210 is operatively configured to increase the pressure of the hydraulic fluid as it flows from the lubrication supply 212 downstream to the components of the propeller control system 200. A lubrication supply conduit 214 provides fluid communication between the lubrication supply 212 and the high pressure pump 210.

A pressure relief valve 216 is positioned downstream of the high pressure pump 210 and is in fluid communication with the high pressure pump 210. For this exemplary embodiment, the pressure relief valve 216 is in fluid communication with the high pressure pump 210 via an HP conduit 218. The pressure relief valve 216 is operatively configured to regulate the pressure of the hydraulic fluid within the propeller control system 200. In the event the pressure within the HP conduit 218 exceeds a predetermined threshold, the pressure relief valve 216 can drain an amount of hydraulic fluid from the HP conduit 218. In particular, the pressure of the hydraulic fluid acting on the spool of the pressure relief valve 216 overcomes a spring biasing force applied by a spring of the pressure relief valve 216, allowing an amount of hydraulic fluid to drain from the system, as indicated by 224. The hydraulic fluid can then be scavenged to the lubrication supply 212, for example.

With reference still to FIG. 3, the pitch control unit 204 includes a primary pitch control valve 230. The primary control valve 230 is operatively configured to adjust the propeller pitch or blade angles of the propeller blades 150 during operation of the engine. For this embodiment, the primary control valve 230 is a spool-type directional control valve that is controlled by an electrohydraulic servovalve (EHSV) 232.

As shown in FIG. 3, the primary control valve 230 is positioned downstream of and is in fluid communication with the high pressure pump 210. In particular, the primary control valve 230 is in fluid communication with the high pressure pump 210 via the HP conduit 218. A first portion of the high pressure hydraulic fluid from the high pressure pump 210 is delivered to the primary control valve 230. A second portion of the high pressure hydraulic fluid is delivered to EHSV 232 such that the high pressure hydraulic fluid can be used to actuate the spool-type primary control valve 230. In this way, the primary control valve 230 can selectively control a flow of hydraulic fluid to or from the pitch actuation assembly 202. In particular, the EHSV 232 controls the spool of the primary control valve 230 to actuate or remain in a null position depending on the condition in which the propeller is operating. At times, if there is excess hydraulic fluid within the primary control valve 230 or the EHSV 232, the fluid can be scavenged to the lubrication supply 212, for example, as denoted by 224.

The propeller assembly 106 operates in one of three conditions, including: an onspeed condition, an overspeed condition, or an underspeed condition. An onspeed condition results when the engine is operating at the RPM set by the pilot. An overspeed condition results when the engine is operating above the RPM set by the pilot. As an example, if the aircraft begins to pitch downward into a descent, the airspeed increases across the propeller blades. When this occurs, the propeller blades are unable to fully absorb the engine power, and as a result, the engine RPM increases above the desired setting. On the other hand, an underspeed condition results when the engine is operating below the RPM set by the pilot. As an example, if the aircraft begins to pitch upward into a climb, the airspeed decreases across the propeller blades. When this occurs, the RPM of the engine decreases below the desired setting. During normal operation, the primary control valve 230 selectively controls a flow of hydraulic fluid to or from the pitch actuation assembly 202 to maintain the RPM of the engine as near as possible to the desired setting, or stated alternatively, to maintain the onspeed condition.

Moreover, for this embodiment, the primary control valve 230 is operatively configured to feather the propeller blades 150 to a fully feathered position when an engine failure condition has been determined. For example, if the torque sensor 280 operatively configured to sense the output torque of the propeller shaft 136 senses that the torque is below a predetermined threshold, for this example, the engine is determined to have experienced an engine failure condition. When it is determined that the engine has experienced an engine failure condition, the primary control valve 230 is operatively configured to selectively allow a controlled amount of hydraulic fluid to the pitch actuation assembly 202 such that the propeller blades 150 are actuated to a fully feather position. This prevents windmilling and cuts drag to a minimum.

Referring still to FIG. 3, the pitch control unit 204 also includes a protective control valve 240. For this embodiment, the protective control valve 240 is operatively configured to take over overspeed protection functionality in the event the primary control valve 230 fails, becomes unresponsive, or erroneously drives the pitch of the propeller blades 150 toward a fine pitch position. In addition, for this exemplary embodiment, the protective control valve 240 is also operatively configured to feather the propeller blades 150 to a full feather position after a predetermined time when an engine failure condition has been determined, which can be determined, for example, by sensing an inadequate torque output of the engine.

As shown in FIG. 3, for this embodiment, the protective control valve 240 is a spool-type directional control valve that is controlled by an electrohydraulic servovalve (EHSV) 242. The protective control valve 240 is positioned downstream of and is in fluid communication with the primary control valve 230. In particular, the protective control valve 240 is in fluid communication with the primary control valve 230 via the HP conduit 220. A portion of the high pressure hydraulic fluid from the high pressure pump is also delivered to EHSV 242 of the protective control valve 240 such that the high pressure hydraulic fluid can be used to actuate the spool-type protective control valve 240. In this way, the protective control valve 240 can selectively control a flow of hydraulic fluid to and from the pitch actuation assembly 202. In particular, the EHSV 242 controls the spool of the protective control valve 240 in the event the primary control valve 230 fails, becomes unresponsive, or erroneously drives the pitch of the propeller blades 150 toward a fine pitch position. The EHSV 242 controls the spool of the protective control valve 240 to allow the primary control valve to be in fluid communication with the pitch actuation assembly 202 or to drain fluid from the pitch actuation assembly 202 through the drain 224 depending on the condition in which the propeller is operating or if the engine has experienced a failure condition.

The pitch hydraulic fluid exits the protective control valve 240 through a port and flows downstream to the pitch actuation assembly 202 or to a ground beta enable valve (GBEV) 270. The pitch hydraulic fluid that flows to the pitch actuation assembly 202 can then flow to the second chamber 174 such that the control piston 168 can be actuated along the axial direction A (in a leftward direction in FIG. 3) such that the propeller blades 150 can ultimately be actuated to a more fine pitch position. More specifically, the pitch hydraulic fluid exiting the protective control valve 240 flows downstream to the oil transfer bearing 186 of the pitch actuation assembly 202. The pitch hydraulic fluid then flows through the beta tube 170 enclosed within the piston rod 184. The pitch hydraulic fluid flows through the beta tube 170 from the propeller gearbox 134 to one of the orifices 176 defined by the beta tube 170. The pitch hydraulic fluid flows through one of the orifices 176 and into the second chamber 174. The volume of pitch hydraulic fluid applies a force to the inboard side 167 of the control piston 168. When the force is sufficient to overcome the biasing force of the spring 172 and the counterweights 182, the control piston 168 translates along the axial direction A (a direction toward the left in FIG. 3). As the control piston 168 is moved along the axial direction A, the piston rod 184 also translates along the axial direction A in unison with the control piston 168. The propeller pitch actuator 178 (FIG. 4) operatively coupled with the piston rod 184 actuates the propeller blades 150 about their respective pitch axes P as the piston rod 184 translates along the axial direction A.

In the event that the primary control valve 230 fails, becomes unresponsive, or erroneously drives the pitch of the propeller blades 150 toward a fine pitch or if an engine failure condition is determined, the protective control valve 240 selectively allows a controlled amount of hydraulic fluid to drain from the pitch actuation assembly 202. In this way, the pitch hydraulic fluid within the second chamber 174 will begin to drain from the chamber due to the loss of pressure. As the control piston 168 translates along the axial direction A (in a direction to the right in FIG. 3), the propeller blades 150 are moved to a more coarse or high pitch position, as noted above. As the pitch of the propeller blades 150 are moved to a coarsened or high pitch position, the propeller blades 150 are able to better absorb the engine power, and as a result, the engine RPM decreases to the desired setting. Consequently, the engine can return to an onspeed condition.

As another example, to actuate the propeller blades 150 to a fully feathered position, the protective control valve 240 can drain pitch hydraulic fluid from the pitch actuation assembly 202. In this way the hydraulic fluid within the second chamber 174 is allowed to drain out of the chamber such that the control piston 168 is biased by the spring 172 and the counterweights 182 toward a full feather position (i.e., the control piston 168 would translate along the axial direction A to a position furthest to the right in FIG. 3 for this embodiment). In this manner, the propeller blades 150 can be adjusted to a full feather position.

As shown in FIG. 3, the aircraft to which the gas turbine engine 100 is operatively coupled includes control levers. In particular, for this embodiment, the aircraft includes a power lever 206. The power lever 206 can be set within a flight range FR or within a ground range GR. In some embodiments, the aircraft to which the gas turbine engine 100 is operatively coupled includes other control levers, such as e.g., a condition lever, propeller control levers, mixture levers, etc.

Referring still to FIG. 3, the pitch control unit 204 also includes GBEV 270 that is controlled by a ground beta enable solenoid (GBES) 272. The GBEV 270 is operatively configured to prevent the propeller assembly 106 from being driven into ground range while the power lever 206 is in flight range. In particular, when the power lever 206 is set in flight range, the GBES 272 prevents the GBEV 270 from actuating to a position that allows for ground enable functions of the propeller assembly 106. For example, where the propeller assembly 106 is a reverse pitch propeller assembly, the GBES 272 prevents the GBEV 270 from allowing for reverse pitch of the propeller blades 150. It will be appreciated that operating a propeller assembly with its propeller blades in a reverse pitch position is generally undesirable and potentially catastrophic. Accordingly, the GBES 272 prevents such inadvertent actuation of the GBES 272.

When the power lever 206 is in ground range, the GBES 272 allows the GBEV 270 to be actuated such that propeller blades 150 can be actuated to a reverse pitch. A reverse pitch position of the propeller blades 150 may be desirable for a multiengine aircraft, for example, when the aircraft is attempting a relatively sharp turn or is turning around. In such an example, the propeller assembly of one engine can have its propeller blades positioned in a positive angle (i.e., such that a forward thrust is produced) and one engine can have its propeller blades positioned in a negative angle (i.e., such that a reverse thrust is produced). In this way, turning maneuvers can be more easily performed.

As shown further in FIG. 3, the GBEV 270 is in fluid communication with the protective control valve 240. More particularly, the GBEV 270 is in fluid communication with the protective control valve 240 via the pitch supply conduit 220. After the pitch hydraulic fluid exits the protective control valve 240, a portion of the pitch hydraulic fluid to flow to the GBEV 270. As further shown in FIG. 3, the GBEV 270 is also in fluid communication with the oil transfer bearing 186. In some embodiments, when ground range is not selected by the power lever 206, the primary control valve 230 and the protective control valve 240 can be actuated to a position such that the pitch hydraulic fluid ceases to flow from these two valves. Thus, the GBEV 270 can take operation of selectively controlling an amount of pitch hydraulic fluid to the pitch actuation assembly 202. To prevent actuation the propeller blades 150 to a negative blade angle, hydraulic fluid is drained from the second chamber 174 through the GBEV to prevent motion toward finer pitch. The hydraulic fluid can flow along the beta tube 170 and to a ground gallery 222 positioned within the oil transfer bearing 186. The hydraulic fluid can then flow back to the GBEV 270 such that the hydraulic fluid can ultimately be drained, as indicated by 224. For example, the hydraulic fluid can be drained and scavenged back to the lubrication supply 212.

In addition, the GBES 272 is in fluid communication with the high pressure pump 210 via the HP conduit 218. In this way, high pressure hydraulic fluid pressurized by the high pressure pump 210 can flow to the GBES 272 to pilot or actuate the solenoid valve.

With reference still to FIG. 3, the gas turbine engine 100 includes a controller 250 equipped with FADEPC. The controller 250 is communicatively coupled with various components of the propeller control system 200. More specifically, the controller 250 is communicatively coupled with a primary speed sensor 234, a primary blade angle feedback sensor 236, a protective speed sensor 244, a protective blade angle feedback sensor 246, the EHSV 232 of the primary control valve 230, the EHSV 242 of the protective control valve 240, the GBES 272, a torque sensor 280, and the power lever 206. The various components of the propeller control system 200 can be communicatively coupled with the controller 250 in any suitable manner, such as e.g., by wired or wireless communication lines (shown by dashed lines in FIG. 3). The communication between the controller 250 and the various components of the propeller control system 200 will be described in turn.

As shown in FIG. 3, the controller 250 is communicatively coupled with the primary speed sensor 234 and the primary blade angle feedback sensor 236. The primary speed sensor 234 is operatively configured to sense the rotational speed of the piston rod 184, the beta tube 170, or some other rotatory component of the propeller assembly 106 that rotates in unison about the axial direction A with the propeller blades 150. During operation, the primary speed sensor 234 sends or otherwise transmits one or more signals indicative of the rotational speed of the propeller blades 150. The controller 250 receives or otherwise obtains the one or more signals indicative of the rotational speed of the propeller blades 150 and can compare the actual rotational speed of the propeller blades 150 with the RPM set by controller 250 equipped with FADEPC. In this manner, the controller 250 can determine whether the propeller assembly 106 is operating in an onspeed condition, an overspeed condition, or an underspeed condition. Based on the determined condition, the controller 250 can send one or more signals to the EHSV 232 of the primary control valve 230 to control the primary control valve 230 to selectively allow an amount of hydraulic fluid to flow to or from the pitch actuation assembly 202 so that the pitch of the propeller blades 150 can ultimately be adjusted. In this way, the propeller assembly 106 is returned to an onspeed condition.

To improve the accuracy and overall efficiency of the engine 100 and the propeller assembly 106, the controller 250 can receive or otherwise obtain one or more signals from the primary blade angle feedback sensor 236. The primary blade angle feedback sensor 236 is operatively configured to sense the blade angle or pitch of the propeller blades 150 by measuring or sensing the axial position of the piston rod 184, the beta tube 170, or some other rotary component that is translated along the axial direction A in unison with the control piston 168. One or more signals indicative of the axial position of the piston rod 184 are sent or otherwise transmitted from the primary blade angle feedback sensor 236 to the controller 250. The controller 250 receives or otherwise obtains the one or more signals indicative of the axial position of the piston rod 184, and based at least in part on the axial position of the piston rod 184, the controller 250 can determine the blade angle of the propeller blades 150. By knowing the pitch or blade angle of the propeller blades 150, the controller 250 can ensure that the various components of the propeller control system 200 are functioning properly. Moreover, the controller 250 can use the sensed information to improve the timing and flows of the various valves of the system such that the propeller control system 200 can become more efficient and effective at adjusting the pitch of the propeller blades 150.

Referring still to FIG. 3, the controller 250 is also communicatively coupled with the protective speed sensor 244 as well as the protective blade angle feedback sensor 246. As noted above, in the event the primary control valve 230 fails, becomes unresponsive, or erroneously drives the pitch of the propeller blades 150 toward a fine pitch position, the protective control valve 240 takes over operation of governing overspeed conditions as well as feathering the propeller blades 150 to a full feather position. The controller 250 then utilizes the protective speed sensor 244 and may use the protective blade angle feedback sensor 246 in conjunction with the protective control valve 240 to control the propeller assembly 106.

The protective speed sensor 244 is operatively configured to sense the rotational speed of the piston rod 184, the beta tube 170, or some other rotational component of the propeller assembly 106 that rotates in unison about the axial direction A with the propeller blades 150. The protective speed sensor 244 can continuously sense the rotational speed of the propeller blades 150. The protective speed sensor 244 sends or otherwise transmits one or more signals indicative of the rotational speed of the propeller blades 150. The controller 250 receives or otherwise obtains the one or more signals indicative of the rotational speed of the propeller blades 150 and can compare the actual rotational speed of the propeller blades 150 with the RPM set in the FADEPC for overspeed governing. In this manner, the controller 250 can determine whether the propeller assembly 106 is operating in an onspeed condition, an overspeed condition, or an underspeed condition. Based on the determined condition, the controller 250 can send one or more signals to the EHSV 242 of the protective control valve 240 to control the protective control valve 240 to selectively allow an amount of hydraulic fluid to flow to or from the pitch actuation assembly 202 so that the pitch of the propeller blades 150 can ultimately be adjusted. In this way, the propeller assembly 106 can be returned to an overspeed governing onspeed condition.

To improve the accuracy and overall efficiency of the engine 100 and the propeller assembly 106, the controller 250 can receive or otherwise obtain one or more signals from the protective blade angle feedback sensor 246. The protective blade angle feedback sensor 246 is operatively configured to sense the blade angle or pitch of the propeller blades 150 by measuring or sensing the axial position of the piston rod 184. One or more signals indicative of the axial position of the piston rod 184 are sent or otherwise transmitted from the protective blade angle feedback sensor 246 to the controller 250. The controller 250 receives or otherwise obtains the one or more signals indicative of the axial position of the piston rod 184, and based at least in part on the axial position of the piston rod 184, the controller 250 can determine the blade angle of the propeller blades 150. By knowing the pitch or blade angle of the propeller blades 150, the controller 250 can ensure that the various components of the propeller control system 200 are functioning properly even with use of the protective control valve 240.

The controller 250 is also communicatively coupled with the GBES 272. If the controller 250 determines that the power lever 206 is in the ground range GR or the pilot has selected a reverse pitch position for the propeller blades 150, the controller 250 can send one or more signals to the GBES 272 such that GBEV 270 is actuated to allow for the propeller blades 150 actuated to the reverse pitch position.

FIG. 3 provides an exemplary controller 250 of the gas turbine engine of FIG. 1 for controlling the propeller control system 200 in a manner as described above. The controller 250 includes various components for performing various operations and functions, such as e.g., receiving one or more signals from the sensors of the propeller control system 200 and the power lever 206, determining the condition of the propeller assembly 106 and engine 100, sending one or more signals to the EHSV 242 of the protective control valve 240 to control the valve 240 to selectively allow a controlled amount of hydraulic fluid to the pitch actuation assembly 202 if the propeller is determined to be in the overspeed condition or if an engine failure condition has occurred.

Figure 5:
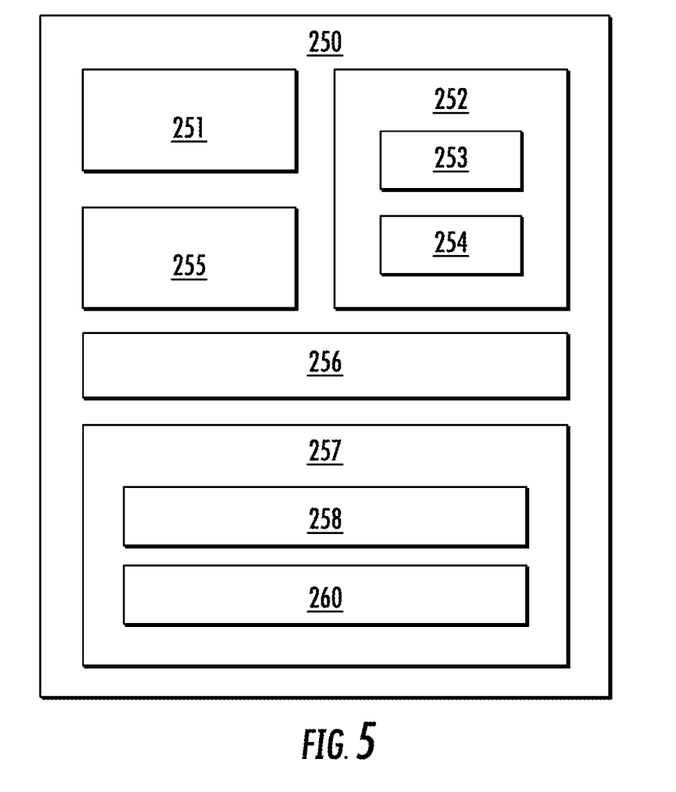
FIG. 5 provides an exemplary controller of the gas turbine engine of FIG. 1.

As shown in FIG. 5, the controller 250 can include one or more processor(s) 251 and one or more memory device(s) 252. The one or more processor(s) 251 can include any suitable processing device, such as a microprocessor, microcontroller, integrated circuit, logic device, and/or other suitable processing device. The one or more memory device(s) 252 can include one or more computer-readable media, including, but not limited to, non-transitory computer-readable media, RAM, ROM, hard drives, flash drives, and/or other memory devices.

The one or more memory device(s) 252 can store information accessible by the one or more processor(s) 251, including computer-readable instructions 254 that can be executed by the one or more processor(s) 251. The instructions 254 can be any set of instructions that when executed by the one or more processor(s) 251, cause the one or more processor(s) 251 to perform operations. In some embodiments, the instructions 254 can be executed by the one or more processor(s) 251 to cause the one or more processor(s) 251 to perform operations, such as any of the operations and functions for which the controller 250 or controllers are configured, such as e.g., receiving one or more signals from sensors and determining an axial position of the beta tube 170 such that the blade angle of the propeller blades 150 can be determined. The instructions 254 can be software written in any suitable programming language or can be implemented in hardware. Additionally, and/or alternatively, the instructions 254 can be executed in logically and/or virtually separate threads on processor(s) 251.

The memory device(s) 252 can further store data 253 that can be accessed by the one or more processor(s) 251. The data 253 can also include various data sets, parameters, outputs, information, etc. shown and/or described herein. The controller 250 can also include a communication interface 255 used to communicate, for example, with other components of an aircraft in which the gas turbine engine 100 is mounted to, such as e.g., another controller configured to control another engine of the aircraft. The communication interface 255 can include any suitable components for interfacing with one or more network(s), including for example, transmitters, receivers, ports, controllers, antennas, and/or other suitable components.

As shown further in FIG. 5, the controller 250 includes primary logic 256 and protective logic 257. Although the primary logic 256 and the protective logic 257 are shown as separate from the one or more processor(s) 251 and the one or more memory device(s) 252, the primary and protective logic 256, 257 can be embodied in the one or more processor(s) 251 and the one or more memory device(s) 252 described above. The primary logic 256 is operatively configured to control the primary control valve 230, and more specifically, the EHSV 232 of the primary control valve 230. The protective logic 257 is operatively configured to control the protective control valve 240, and more specifically, the EHSV 242 of the protective control valve 240. In particular, the protective logic 257 includes an overspeed logic module 258 and a feathering logic module 260. The overspeed logic module 258 provides controller 250 with the logic to control the EHSV 242 of the protective control valve 240 in actuating the propeller blades 150 to a higher more coarse pitch to ultimately move propeller assembly 106 from an overspeed condition to governing to a selected speed condition. Likewise, the feathering logic module 260 provides controller 250 with the logic to control the protective control valve 240 in actuating the propeller blades 150 to a full feather position when an engine failure condition has been determined by the controller 250.

Figure 6:
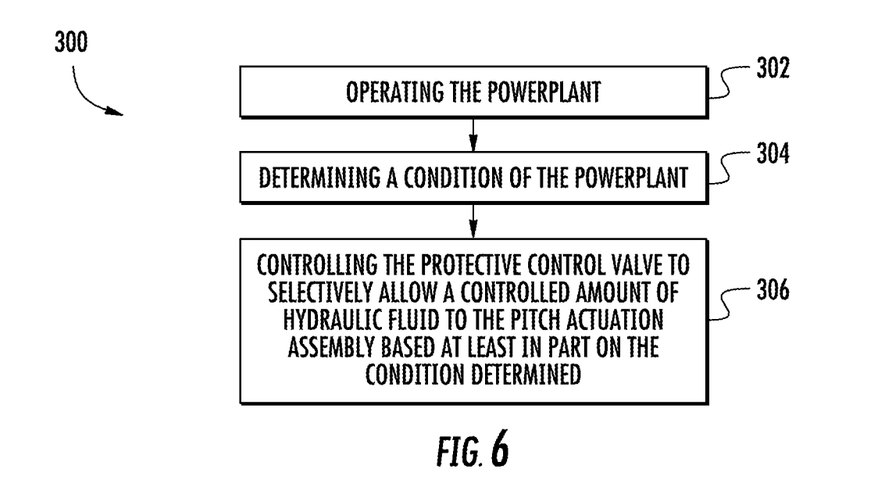
FIG. 6 provides an exemplary flow diagram according to an exemplary embodiment of the present disclosure.

FIG. 6 provides a flow diagram of an exemplary method (300) for determining an angular position of the propeller blades 150 of a propeller assembly 106 about their respective pitch axes P according to exemplary embodiments of the present disclosure. Some or all of the method (300) can be implemented by one or more of the components described herein, such as e.g., the controller 250, the sensors 234, 236, 244, 246, the beta tube 170, etc.

At (302), exemplary method (300) includes operating the powerplant. For example, the powerplant can be the gas turbine engine shown and described in FIGS. 1 and 2.

At (304), exemplary method (300) includes determining a condition of the powerplant. For example, the condition could be one of an overspeed condition, an underspeed condition, or an engine or powerplant failure condition.

In some exemplary implementations, during determining the condition, the exemplary method (300) includes obtaining one or more signals indicative of a power setting of the powerplant. For instance, the one or more signals indicative of the power setting of the powerplant can be obtained by the controller 250. The power lever 206, or an angular position sensor device, can send one or more signals indicative of the angle of the power lever 206. Based on the angle of the power lever 206, the controller 250 can determine the power setting selected by the pilot. As another example, the power setting selected by the pilot can be digitized, and thus, the power setting can be transmitted to the controller 250 digitally. In such implementations, the exemplary method (300) includes obtaining one or more signals indicative of the rotational speed of the propeller blades 150 about the axial direction A. For instance, the rotational speed of the propeller blades 150 can be determined by the controller 250 based on one or more signals from the primary speed sensor 234 or the protective speed sensor 244. The primary or protective speed sensors 234, 244 can sense or measure the rotational speed of a rotator component, such as, e.g. the piston rod 184, the beta tube 170, or some other rotary component that rotates about the axial direction A in unison with the propeller blades 150. After determining the rotational speed of the propeller blades 150, the exemplary method (300) includes comparing the power setting with the rotational speed of the propeller blades. In this way, the controller 250 can determine whether the powerplant or engine is operating in an onspeed condition, an underspeed condition, or an overspeed condition. Once the condition of the powerplant or engine is known, the propeller control system 200 can make the necessary adjustments to the pitch of the propeller blades 150.

In yet further exemplary implementations, when determining the condition of the powerplant, the method (300) further includes: obtaining one or more signals indicative of a power setting of the powerplant. The power setting of the powerplant can be obtained in the manner noted above. For example, the power setting can be determined based at least in part on one or more signals indicative of the angular position of the power lever 206. Based on the signals, the controller 250 can determine the power setting of the powerplant. The exemplary method (300) can further include obtaining one or more signals indicative of a torque output of the powerplant. For instance, the torque sensor 280 position proximate the propeller shaft 136 (FIG. 3) can sense the torque output of the core turbine engine 104 of the powerplant. One or more signals indicative of the torque output can be routed to the controller 250. Once the one or more signals indicative of the output of the powerplant have been obtained by the controller 250, the controller 250 compares the power setting with the torque output of the powerplant. If the torque output of the powerplant is at or below a predetermined threshold for the given power setting, the controller 250 determines that a powerplant or engine failure condition has occurred. When such a powerplant failure condition has been determined, the controller 250 can send one or more signals to the EHSV 232 of the primary control valve 230 to actuate the primary control valve 230 such that the propeller blades 150 are actuated to a fully feathered position.

At (306), exemplary method (300) includes controlling the protective control valve 240 to selectively allow a controlled amount of hydraulic fluid to flow to or drain from the pitch actuation assembly 202 based at least in part on the condition determined. When the flow of hydraulic fluid is drained from the chamber 174 of the pitch actuation assembly 202, the pressure drop causes the control piston 168 to move to a position such that the propeller blades 150 are actuated to a fully feathered position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine defining an axial direction, a radial direction, and a circumferential direction, the engine including a variable pitch propeller assembly driven by the engine, the engine comprising:
    a plurality of propeller blades rotatable about the axial direction and spaced apart along the circumferential direction, each propeller blade rotatable through a plurality of blade angles about respective pitch axes thereof each extending in the radial direction;
    a propeller control system, including:
        a pitch actuation assembly for adjusting the plurality of propeller blades through the plurality of blade angles;
        a pitch control unit, including;
            a primary control valve configured to selectively allow a flow of hydraulic fluid to or from the pitch actuation assembly;
            a protective control valve configured to selectively allow a flow of hydraulic fluid to or from the pitch actuation assembly;
        a controller communicatively coupled with the primary control valve and the protective control valve, wherein the controller is configured to:
            determine a condition of the engine by comparing an expected rotational speed of the propeller blades with an actual rotational speed of the propeller blades, the expected rotational speed determined based on a power setting of the engine; and
            control the protective control valve to selectively allow a controlled amount of hydraulic fluid to flow to or from the pitch actuation assembly based at least in part on the condition of the engine.

2. The engine of claim 1, wherein the condition is an overspeed condition.

3. The engine of claim 1, wherein the condition is an engine failure condition, and wherein the controlled amount of hydraulic fluid is an amount sufficient to position the propeller blades in a full feather position.

4. The engine of claim 1, wherein the controller is configured to control the protective control valve to selectively allow the controlled amount of hydraulic fluid to or from the pitch actuation assembly if the condition is either an overspeed condition or an engine failure condition.

5. The engine of claim 1, wherein the protective control valve is controlled by an electrohydraulic servovalve.

6. The engine of claim 1, wherein the primary control valve is controlled by an electrohydraulic servovalve.

7. The engine of claim 1, wherein the controller is equipped with full authority digital engine and propeller control.

8. The engine of claim 1, wherein the propeller control system further including:
a rotary component rotatable about the axial direction in unison with the propeller blades;
a primary speed sensor for sensing a rotational speed of the rotary component, the primary speed sensor communicatively coupled with the controller; and
a protective speed sensor for sensing the rotational speed of the rotary component, the protective speed sensor communicatively coupled with the controller.

9. A propeller control system for a variable pitch propeller assembly driven by an engine defining an axial direction, a radial direction, and a circumferential direction, the variable pitch propeller assembly including a plurality of propeller blades rotatable about the axial direction and spaced apart along the circumferential direction, each propeller blade rotatable through a plurality of blade angles about respective pitch axes thereof each extending in the radial direction; the propeller control system comprising:
a pitch actuation assembly for adjusting the plurality of propeller blades through the plurality of blade angles;
a pitch control unit, including:
a primary control valve configured to selectively allow a flow of hydraulic fluid to or from the pitch actuation assembly;
a protective control valve configured to selectively allow a flow of hydraulic fluid to or from the pitch actuation assembly;
a controller communicatively coupled with the primary control valve and the protective control valve, wherein the controller is configured to:
determine a condition of the engine by comparing an expected rotational speed of the propeller blades with an actual rotational speed of the propeller blades, the expected rotational speed determined based on a power setting of the engine, wherein the condition is one of an overspeed condition and an engine failure condition; and
control the protective control valve to selectively allow a controlled amount of hydraulic fluid to flow to or from the pitch actuation assembly based at least in part on the condition determined.

10. The propeller control system of claim 9, wherein when the condition is the engine failure condition, the controlled amount of hydraulic fluid is an amount sufficient to position the propeller blades in a full feather position.

11. The propeller control system of claim 9, wherein the controller includes a protective logic module for controlling the protective control valve, and wherein the protective logic module includes an overspeed logic module and a feathering logic module.

12. The propeller control system of claim 9, wherein the propeller control system further including:
a rotary component rotatable about the axial direction in unison with the propeller blades;
a protective speed sensor for sensing a rotational speed of the rotary component, the protective speed sensor communicatively coupled with the controller; and
a protective blade angle feedback sensor for sensing an axial positioning of the rotary component such that the blade angle of the propeller blades can be determined, the protective blade angle feedback sensor communicatively coupled with the controller.

13. The propeller control system of claim 9, wherein the protective control valve is controlled by an electrohydraulic servovalve.

14. A method for controlling a variable pitch propeller assembly driven by a powerplant using a propeller control system, the powerplant defining an axial direction and a radial direction and including a controller, the variable pitch propeller assembly having a plurality of propeller blades rotatable about the axial direction and adjustable about respective pitch axes thereof each extending along the radial direction, the propeller control system including a pitch actuation assembly for actuating the propeller blades about their respective pitch axes and a pitch control unit including a primary control valve and a protective control valve both communicatively coupled with the controller, the primary control valve and the protective control valve each configured to selectively control a flow of hydraulic fluid to or from the pitch actuation assembly, the method comprising:
operating the powerplant;
determining a condition of the powerplant by;
obtaining one or more signals indicative of a power setting of the powerplant;
obtaining one or more signals indicative of an actual rotational speed of the propeller blades about the axial direction; and
comparing an expected rotational speed of the propeller blades with the actual rotational speed of the propeller blades, the expected rotational speed determined based on the power setting of the powerplant; and
controlling the protective control valve to selectively allow a controlled amount of hydraulic fluid to or from the pitch actuation assembly based at least in part on the condition determined.

15. The method of claim 14, wherein the condition is a powerplant failure condition, and wherein during determining the condition of the powerplant, the method further including:
obtaining one or more signals indicative of a torque output of the powerplant; and
comparing the torque output of the powerplant to a threshold, the threshold based on the power setting; and
wherein when the protective control valve selectively allows the controlled amount of hydraulic fluid to flow to or from the pitch actuation assembly, the controlled amount is an amount sufficient to position the propeller blades in a fully feathered position.

16. The method of claim 14, wherein the protective control valve is controlled by an electrohydraulic servovalve.

* * * * *